United States Patent [19]

Kuzyk et al.

[11] Patent Number: 5,682,447
[45] Date of Patent: Oct. 28, 1997

[54] PHOTOMECHANICAL POSITIONING AND STABILIZATION METHOD AND DEVICES USING OPTICAL FIBERS AND FEEDBACK

[75] Inventors: Mark G. Kuzyk; David J. Welker, both of Pullman, Wash.

[73] Assignee: Washington State University Research Foundation, Pullman, Wash.

[21] Appl. No.: 387,422

[22] Filed: Feb. 9, 1995

Related U.S. Application Data

[63] Continuation-in-part of Ser. No. 310,883, Sep. 22, 1994, Pat. No. 5,446,808.

[51] Int. Cl.$^6$ .................... G02B 6/10; G01B 9/02
[52] U.S. Cl. ................... 385/13; 385/12; 385/25; 385/27; 385/141; 385/147; 356/345; 356/352
[58] Field of Search ................... 385/12, 13, 15, 385/25, 27, 31, 38, 39, 49, 88, 141, 143, 145, 147; 356/345, 356, 358, 399, 400, 432, 352; 250/227.11, 277.14, 227.18, 227.19, 227.28

[56] References Cited

U.S. PATENT DOCUMENTS

| | | | |
|---|---|---|---|
| 4,360,272 | 11/1982 | Schmadel et al. | 356/352 |
| 4,569,570 | 2/1986 | Brogardh et al. | 385/12 X |
| 4,600,310 | 7/1986 | Cramp et al. | 385/12 |
| 4,627,728 | 12/1986 | Willson | 356/345 |
| 4,633,079 | 12/1986 | Rieger | 385/13 X |
| 4,865,416 | 9/1989 | Pratt | 385/12 |
| 5,096,277 | 3/1992 | Kleinerman | 385/12 |
| 5,202,939 | 4/1993 | Belleville et al. | 385/12 |
| 5,240,643 | 8/1993 | Buckley et al. | 385/12 X |
| 5,363,463 | 11/1994 | Kleinerman | 385/123 |
| 5,367,583 | 11/1994 | Sirkis | 385/12 |
| 5,446,808 | 8/1995 | Kuzyk et al. | 385/13 |
| 5,451,772 | 9/1995 | Narendran | 250/227.19 |

FOREIGN PATENT DOCUMENTS

| 57-168126 | 10/1982 | Japan | 356/352 X |
|---|---|---|---|

OTHER PUBLICATIONS

Kuzyk et al., "Guest–host polymer fibers for nonlinear optics," *Appl. Phys. Lett.* 59(8), 902–904 Aug. (1991).

Mamada et al., "Photoinduced Phase Transition of Gels," *Macromolecules* 23:1517–1519 (1990). (No Month of publication).

Suzuki and Tanaka, "Phase transition in polymer gels induced by visible light," *Letters to Nature* 346:345–347 (26 Jul. 1990).

Osada and Ross–Murphy, "Intelligent Gels," *Scientific American* 82–87 (May 1993).

*Primary Examiner*—Brian Healy
*Attorney, Agent, or Firm*—Klarquist Sparkman Campbell Leigh & Whinston, LLP

[57] ABSTRACT

A novel photomechanical positioning method using optic fibers, and apparatuses that employ the method, is described. The method comprises providing an optic fiber that changes length in response to the transmission of a light beam through the fiber. The optic fiber may be attached to an object capable of movement in response to a change in the fiber's length. An illustrated embodiment of an apparatus employing such method is an interferometer that includes an optic fiber made from a polymeric organic material. A movable mirror forms one arm of the interferometer, and is attached to the optic fiber for movement in response to changes in the length of the fiber. A light source, such as a laser, generates a beam of light that is transmitted through the optic fiber. The system also generally includes a feedback path for transmitting a portion of the light beam into the end of the fiber opposite the end of the fiber to which the object is attached. The polymeric fibers typically have a plurality of fiber lengths corresponding to stable states of length between which the length of the fiber may be changed, either discretely or continuously, by the application of a force. A Fabry-Perot interferometer also is described. The fibers in combination with a light source also can function as tranducers and logic elements.

20 Claims, 12 Drawing Sheets

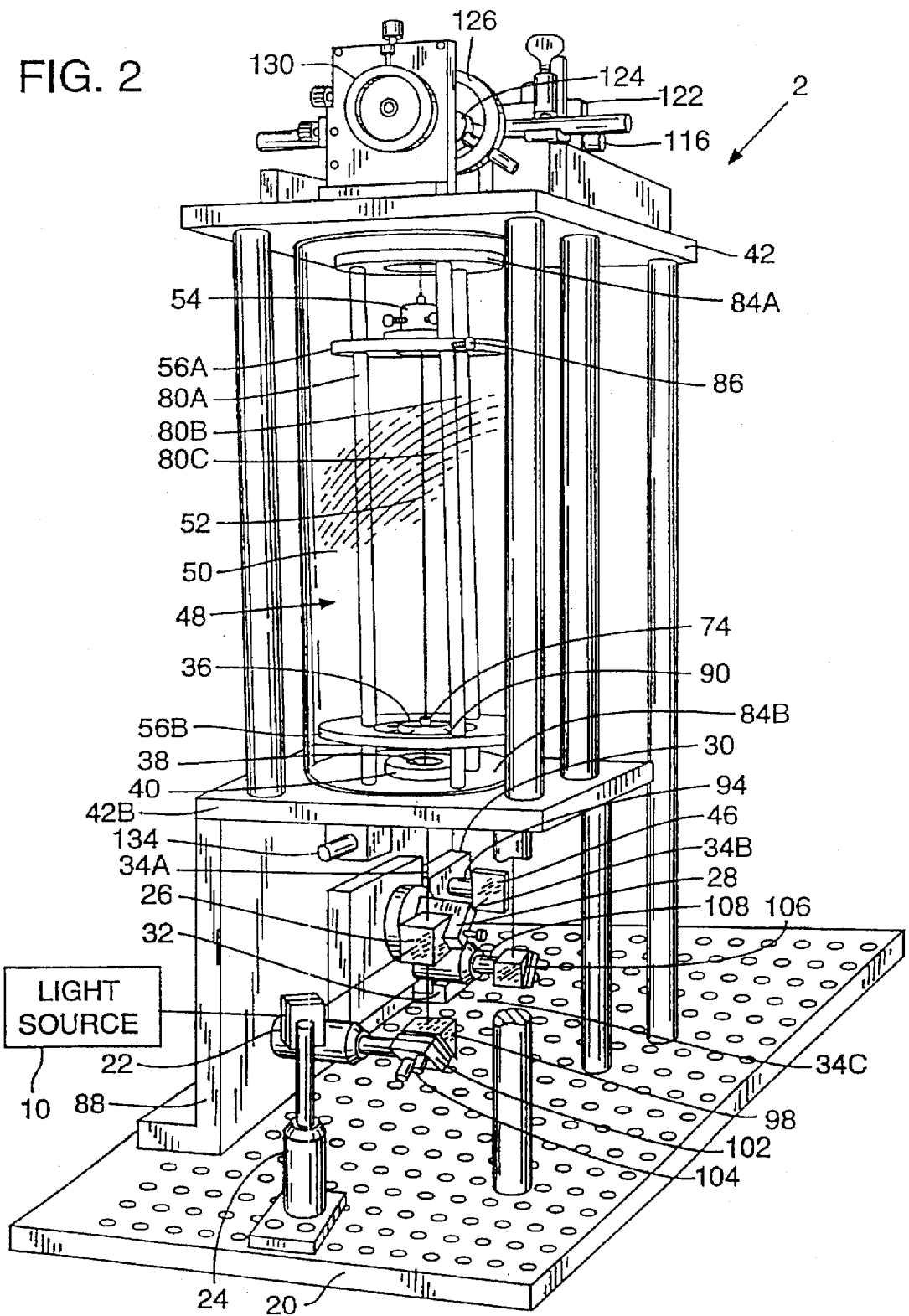

PHOTOMECHANICAL POSITIONING AND STABILIZATION METHOD AND DEVICES USING OPTICAL FIBERS AND FEEDBACK

CROSS REFERENCE TO RELATED APPLICATION

This application is a continuation-in-part of application Ser. No. 08/310,883, filed Sep. 22, 1994, now U.S. Pat. No. 5,446,808, which is incorporated herein by reference.

GOVERNMENT SUPPORT

This invention was made with government support provided under Army Research Office Contract Number DAAL 03-92-G-0389. The government may have certain rights in this invention.

FIELD OF THE INVENTION

This invention concerns a method for positioning and/or stabilizing movable objects using optical fibers and the photomechanical transducer effect, and to devices that employ the method.

BACKGROUND OF THE INVENTION

The absorption of thermal energy by a material having a positive thermal expansion coefficient causes the material to expand, which is an important consideration when manufacturing a device. For example, the changes that occur in the physical dimensions of circuit-board components upon heating can stress the board, thereby reducing its efficiency and lifetime. Many published documents refer to this problem. For instance, Williams et al. state that in "a magnetic field sensor . . . the temperature dependence of the Verdet constant and the thermal expansion of the material set a fundamental limit to the precision of the measurement." See "Compensation for Temperature Dependence of Faraday Effect in Diamagnetic Materials: Application to Optical Fibre Sensors," *Electronics Letters*, 27:1131–1132 (1991).

Electromechanical devices have been used to compensate for the changes that occur as a result of temperature-induced structural changes. For instance, in an electrical-mechanical positioner, a computer instructs a motor controller to move a motor shaft to induce corrections in the position of a movable object. The controller sends an electrical impulse that steps the motor shaft through electromagnetic induction. An encoder returns an electrical signal to the computer which determines the position of the movable object. The computer then decides whether another adjustment is necessary. Electrical-mechanical positioners require using these additional components to monitor and correct the position of the movable object. As a result, compensating for temperature-induced structural changes adds to the cost of manufacturing and the bulk of such devices.

Light transmission through an optical fiber heats the fiber through optical thermal absorption. For fibers having positive thermal expansion coefficients, this causes an increase in fiber length. This effect also has been considered a nuisance, primarily because the change in dimensions is associated with reduced performance for the apparatus in question.

SUMMARY OF THE INVENTION

The negative attributes associated with thermal expansion have been well documented. However, until the present invention, no one apparently appreciated that the photomechanical transducer effect (i.e., transducing light energy into mechanical energy, referred to hereinafter as the photomechanical effect) that occurs in optic fibers can be used to accurately and quickly position a movable object, such as movable components of electronic devices that are attached to such fibers, and to stabilize the position of such objects (i.e., compensate for gradual position changes or drifts that occur in such objects).

The present invention exploits the change in fiber length that occurs upon optical heating, and provides a novel photomechanical positioning method and apparatuses that employ the method. A number of materials may be used to form optic fibers useful for the present invention, and the invention is directed to using any such fibers in any application wherein a change in length of the fiber by optical heating is used to bring about a positive result, such as the positioning of a movable object. The selection of an appropriate optic material will best be decided by considering various factors, including the application in question, the ability of the material to transmit light at various wavelengths, the ability to form fibers of suitable dimensions (which will vary from device to device), the expansion coefficients of the material, particularly the linear expansion coefficient, the toxicity of the material and the cost of the material.

Currently, polymer materials are preferred compounds for forming optic fibers for the present invention. In general, polymer materials useful for the present invention may be selected from the group consisting of poly(alkenoic acids), poly(alkenes), poly(vinyl pyrrolidones), poly(vinyl halides), poly(vinyl alcohols), and combinations thereof. Presently preferred compounds are selected from the group consisting of poly(alkyl acrylates), including combinations of different poly(alkyl acrylates). Especially preferred polymers, as presently contemplated for the present invention, are selected from the group consisting of poly(alkyl methacrylates), with poly(methyl methacrylate) being a presently preferred compound. The polymeric material also may comprise a co-polymer of two or more different monomeric subunits. For instance, the polymeric material may comprise a co-polymer of the materials listed above, or a co-polymer of an olefin, such as ethylene, and one of the materials listed above.

The optic fiber also may include a dye material. Typically, the dye material is selected to absorb light having similar wavelengths as emitted by the light source. Preferably, the dye is selected to absorb an appropriate amount of light for performing the task in question, and may be selected to have a maximum light absorption corresponding to the wavelength of light emitted by the light source. Solely by way of example, azo dyes and squarylium dyes have been shown to be useful dyes for the present invention. The polymer material generally, but not necessarily, satisfies either the formula $(-R-Y-R'-)_n$ or $(-R-Y-Y'-R'-)_n$. R and R' may be the same or different polymeric materials that contract or expand in response to the transmission of light through the fiber. Y and Y' may be the same or different dye compounds. The determination of n is made by considering, inter alia, whether a compound having a particular n value transmits light and whether it can be formulated into fibers suitable for practicing the method. The resulting mechanical properties of the fibers, such as flexibility and strength, also must be considered. R and R' generally are selected from the groups discussed above. Currently, poly(methyl methacrylate)-doped optic fibers having about 1 weight percent (based on the initial weight of the monomer used to form the polymer) of an azo or squarylium dye are presently preferred polymer materials.

The present invention provides a method for positioning an object. The method comprises providing an optic fiber that changes length in response to the transmission of a light through the fiber. The fiber is operably connected to an object capable of movement in response to a change in the fiber's length. A light source generates a beam of light, which is transmitted through the fiber. This causes the length of the fiber to change, as a result of photothermal heating, from a first length to a second length. The optic fibers typically have a plurality of fiber lengths corresponding to stable states of length between which the length of the fiber may be changed by the application of a force. Each stable state is maintained by photothermal heating of the fiber. The method may comprise selecting a particular stable length position for a particular application by transmitting light through the optic fiber.

The method also may involve the step of providing an optical feedback path for transmitting a portion of the light beam into the end of the fiber opposite the end of the fiber to which the object is attached. By providing feedback, the object may be continuously repositioned, i.e. stabilized, when its position changes in response to the application of an external force.

One specific embodiment of an apparatus that employs the method of the present invention is directed to an interferometer. Using optical feedback, an optic fiber continuously positions the mirror without using motors, encoders or computers. In this specific embodiment, an optical system directs light from a light source into the end of the fiber. The absorption of light heats the fiber. The optical system also provides optical feedback for transmitting a portion of the light into the end of the fiber opposite the end of the fiber to which the mirror is attached. This helps stabilize the position of the mirror when its position is changed in response to the application of an external force, such as air vibrations, or bumping the instrument.

Accordingly, an object of the present invention is to provide a method, and devices employing the method, for continuously or discretely positioning and/or stabilizing a movable object using optic fibers and the photomechanical effect.

An advantage of the present invention is that the optic fiber is capable of making minute adjustments to the position of the movable object, either continuously or discretely, with a fast response time, thereby eliminating the need to use electrical-mechanical positioning devices.

BRIEF DESCRIPTION OF THE DRAWINGS

FIG. 2 is a side elevational view of the apparatus represented schematically in FIG. 1.

DETAILED DESCRIPTION OF THE PREFERRED EMBODIMENTS

Figure 1:
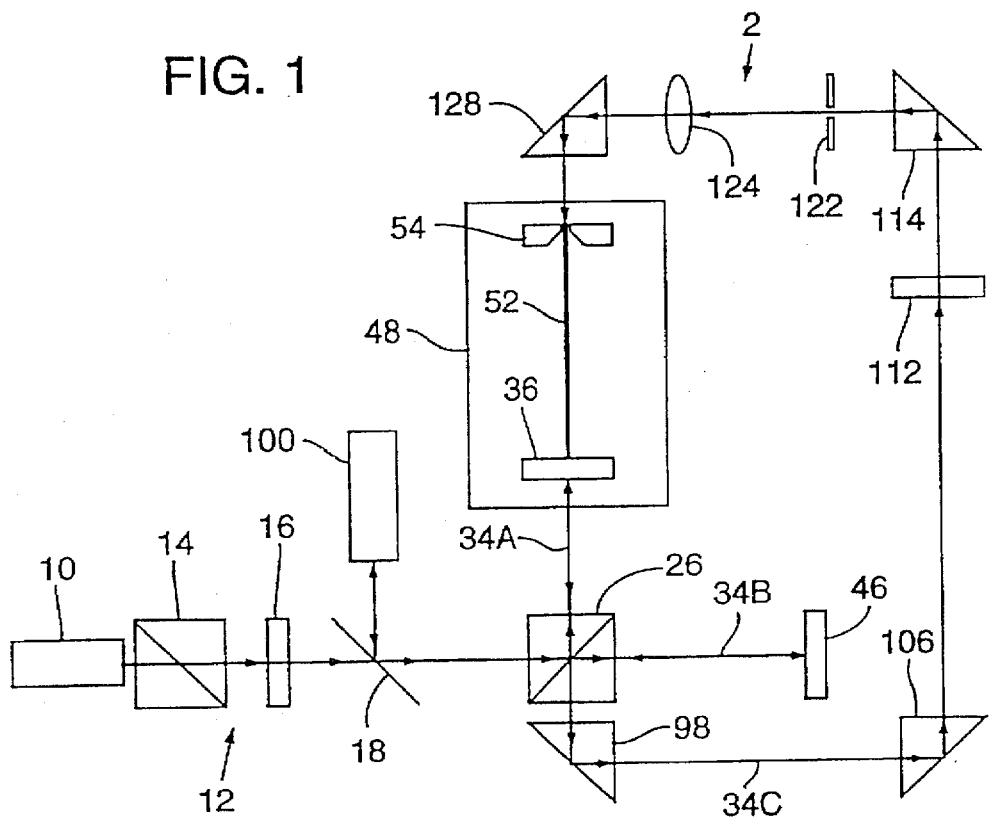
FIG. 1 is a schematic diagram of an interferometer, which is one embodiment of an apparatus that utilizes optic fibers to position a movable object according to the method of the present invention.

This invention is directed to a method for positioning movable objects, and stabilizing the position of such objects, using the photomechanical effect. This is accomplished by attaching a light-transmitting fiber to a movable object, directing a beam of light at the object to sense its position, and then using optical feedback through the fiber to change its length through optical heating. A detailed discussion is provided below concerning how to select and make suitable optic fibers, including polymeric materials doped with a dye to increase the absorption efficiency of the polymer, and to impart greater effects on the bulk mechanical properties of the fiber in response to the transmission of light. Thereafter, a discussion is provided concerning how to make and use a specific embodiment of an apparatus that utilizes the fibers and the photomechanical effect to continuously monitor the position of a movable mirror. It should be understood by one skilled in the art that the present invention is not limited to the use of polymeric organic optic fibers, nor to such fibers in the described interferometer.

I. OPTIC FIBERS

There are virtually unlimited examples of materials that are suitable for use as optic fibers for positioning movable objects, including both inorganic and organic materials. Moreover, it will be appreciated that the proper selection of such fibers primarily will be determined by considering both the properties of the fiber, as well as the requirements imposed by the particular application of the fibers for stabilizing and/or positioning movable objects. For instance, the wave length and intensity of the light transmitted through the fiber must be considered, as should the cooling rate and ambient conditions surrounding the fiber. Furthermore, it has been determined that the increase in the length of the fiber is proportional to the optical absorption coefficient and the linear thermal expansion coefficient of the fiber, as well as the intensity of the light. And, the change in the length of the fiber is inversely proportional to the mass of the fiber, and the specific heat of the material used to form the material. Thus, one skilled in the art will understand that the selection of a fiber for a particular application is determined by considering these and other factors.

Additional information concerning materials for forming optic fibers that are useful for practicing the present invention may be obtained by referring to, inter alia: Brandrup and Immergut's *Polymer Handbook*, 3rd Ed. (Wiley-Interscience, New York 1989); Musikant's *Optical Materials*: Volume 1, (1990); and *"Materials for Nonlinear Optics: Chemical Perspectives,"* American Chemical Society, ACS Symposium Series, Vol. 455, S. R. Marder et al. (1991). Each of these references is hereby incorporated by reference.

A. Polymer Materials for Forming Optic Fibers

Polymer materials currently are preferred compounds for forming optic fibers useful for the present invention. To reiterate, the selection of an appropriate polymeric material will best be decided by considering the factors listed above, as well as the toxicity and cost of the material. However, solely to provide more specific guidance concerning the selection of an appropriate polymeric optic material, polymers of the lower alkenoic acids, such as poly(alkyl acrylates) have been used as suitable optic materials for the present invention. As used herein, the term "lower" describes alkyl or alkenyl straight or branched carbon chains having from about 1 to about 10 carbon atoms, and more generally from about 3 to about 10 carbon atoms. Examples of suitable lower alkenoic acids include acrylic acid, butanoic acid, etc. Suitable materials also include olefinic position isomers, optical isomers, and other derivatives of such materials.

With specific reference to the polyacrylate derivatives, suitable polymeric materials include polymeric materials made from lower alkyl ester derivatives of acrylic acid, such as methyl acrylate, ethyl acrylate, propyl acrylate, etc. Moreover, the lower alkyl derivatives of methacrylic acid also are useful polymeric compounds. These compounds would include poly(methyl methacrylate), poly(ethyl methacrylate), poly(propyl methacrylate), and additional lower alkyl derivatives.

Other examples of suitable light transparent materials include polyethylene, cellulose, poly(vinylpyrrolidone), poly(vinylhalides), such as poly(vinyl chloride), and poly (vinyl alcohols).

Thus, in general, materials useful for forming optic fibers for the present invention may be selected from the group consisting of poly(alkenoic acids), poly(alkenes), poly(vinyl pyrrolidones), poly(vinyl halides), poly(vinyl alcohols), and combinations thereof. Presently preferred compounds are selected from the group consisting of poly(alkenoic acids), particularly poly(acrylates), including combinations of poly (acrylates). Especially preferred polymers, as presently contemplated for the present invention, are selected from the group consisting of poly(alkyl methacrylates), with poly (methyl methacrylate) being a presently preferred compound.

In general, long, thin materials are most efficient for exploiting the photomechanical effect in optic fibers. This is because, for a given strain, the light-induced change in the length of a material is proportional to its length. The strain is proportional to the light intensity within the material. Optic fibers therefore provide at least two advantages. First, they provide a way of confining light of high intensity. Second, optic fibers can be made both long and thin so that the change in the length of the fiber that accompanies optical heating also can be significant.

B. Dye Compounds Useful for Forming Optic Fibers

The optic fibers of the present invention also may be formed from materials that are doped with a light-absorbing dye. Where polymers are used, the polymeric portion of these optic materials acts as a host for the dye molecules. For certain polymers, the bulk mechanical properties of the polymer change in the presence of light. This change in the bulk mechanical properties may be mediated by using molecular dopants. Typically, the polymer acts as a fairly rigid support for the dye molecules.

U.S. Pat. No. 5,252,494 describes a number of dye materials that potentially are useful for forming optic fibers for the present invention. The disclosure of U.S. Pat. No. 5,252,494 is hereby incorporated by reference. However, solely by way of example, the following dyes are currently considered dyes useful for forming polymer/dye optic fibers.

1. Examples of Dye Molecules Used as Dopants

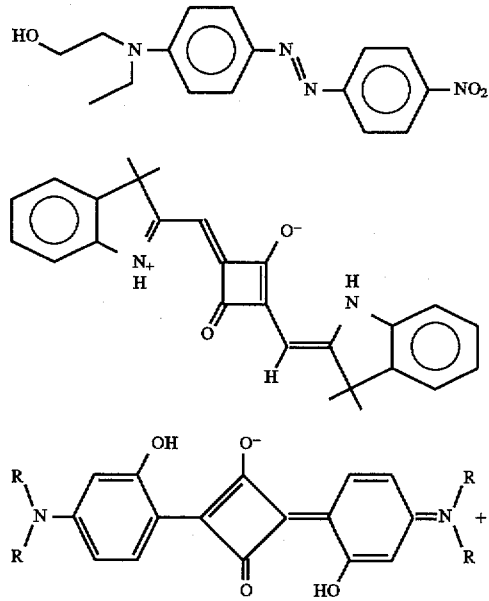

The first dye shown above is representative of a class dyes referred to as azo dyes, in reference to the azo group, i.e., N=N. The second and third dyes are representative of a class of dyes referred to as squarylium dyes. Hence, although generally any dye material will suffice for forming the polymer/dye optic fibers of the present invention, specific examples of such dyes may be selected from the group consisting of azo dyes, squarylium dyes, and combinations thereof.

EXAMPLE 1

This example describes the preparation of a poly(methyl methacrylate) (PMAA) optic fiber. Standard test tubes were filled with methyl methacrylate (MMA) monomer, which can be purchased commercially from such companies as Aldrich Chemical Company. A minor portion of PMAA can be added to the MMA to increase the viscosity thereof. A small portion of AIBN, a well-known polymerization initiator, was then added to the composition in the preforms. The composition in the test tube was then allowed to slowly polymerize over a period of several weeks at room temperature. The slow polymerization helped reduce the formation of bubbles in the core region of the fiber. The preform was removed from the test tube and then heated in an oven at about 90° C. to remove any absorbed water.

A fiber drawing apparatus was then used to form long thin fibers. The fiber drawing apparatus included a preform feeding system, a heater and a fiber take-up wheel. This apparatus is shown schematically in Kuzyk et al.'s "Guest Host Polymer Fiber for Nonlinear Optics," *Appl. Phys. Lett.*, pp. 902–904, Vol. 59, No. 8 (1991). This reference is hereby incorporated by reference. The drawing apparatus was used to form a PMAA fiber having a length of about 30 cm and a diameter of about 400 μm. The end-face of the polymer fiber was rendered smooth by contacting it with a hot plate.

EXAMPLE 2

This example describes the preparation of a poly(methyl methacrylate) (PMAA) optic fiber doped with a squarylium dye material. Standard test tubes were filled with a solution comprising methyl methacrylate (MMA) monomer and about 1 weight percent of a squarylium dye as shown above. A minor portion of PMAA also can be added to the MAA to increase the viscosity of the composition. A small portion of AIBN was then added to the composition, and the composition was allowed to slowly polymerize over a period of several weeks at room temperature. The preform was removed from the test tube and then placed in an oven and baked at about 90° C. to remove any absorbed water.

The fiber drawing apparatus was then used to form long thin fibers, such as fibers having a length of about 30 cm and a diameter of about 400 μm. The end-face of the polymer fiber was then rendered smooth by contacting it with a hot plate.

In a manner similar to that described above for Example 2, additional fibers have been made from PMAA that were doped with from about 0.001 to about 1 weight percent, based on the weight of the MAA monomer, of each of the dyes shown above.

EXAMPLE 3

This example describes an alternative process for the production of a dye-doped fiber according to the present invention. Ten milliliters of MMA were placed in a test tube and then mixed with 2 drops of t-butyl peroxide (a polymerization initiator), two drops of a butanethiol (a chain transfer agent), and 35 mg of a squarylium dye as shown above. The mixture was then thoroughly agitated using a mechanical mixer for about 15 minutes, and thereafter filtered through a 0.2 micron syringe filter. The mixture was then placed in a capped test tube and heated in an oven at 95° C. for a period of about one week to polymerize the MMA. The cap of the test tube was then removed, and the polymerized mixture allowed to degas for about a week. The test tube was then broken, the core material was removed and then squeezed between two half-round clamps until closed. Once the half-round clamps were closed, the core material was then squeezed from either end using a rail squeezer at a temperature of about 120° C. The plug was then removed, and the polymer degassed for a week at 95° C. The material was then pulled into a fiber using the fiber drawing apparatus.

II. PHOTOMECHANICAL POSITIONING OF MOVABLE OBJECTS

FIGS. 1–4 illustrate one embodiment of a photomechanical positioning apparatus 2 that employs optic fibers for positioning a movable object. The device depicted in these figures includes an interferometer. An interferometer is capable of making various measurements, such as the precise determination of wavelengths, spectral fine structure and indices of refraction. The interferometer operates by separating light into two beams using a beam splitter. The light beams are then directed along different optical paths having different path distances using a system of prisms and mirrors, including a fixed mirror and a movable mirror. The light beams are then reunited and interfere with each other. The nature of the interference (i.e., destructive or constructive interference) determines the output intensity of the apparatus.

Interferometers are not new per se. However, the illustrated embodiment of apparatus 2 includes the first known interferometer to use an optic fiber and the photomechanical effect to continuously position a movable mirror as described in more detail below.

With reference to FIG. 1, it can be seen that the operation of apparatus 2 is initiated by a light source 10. An optical isolator 12 also may be used to prevent back reflection from entering the light source, although isolator 12 is not necessary to the function of apparatus 2. When used, optical isolator 12 includes a polarizing beam splitter 14 and a wave plate 16. The apparatus further includes a beam splitter 26 for splitting the light emitted from the light source into a two light beams which travel along different light paths 34A, 34B to a movable mirror 36 and fixed mirror 46. The two light beams reflected by these mirrors 36 and 46 are then recombined at the beam splitter 26. A portion of the combined beam is directed to a detector 100 by mirror 18 (FIG. 1), and another portion is directed along light path 34C to an optic fiber 52 as described above. Fiber 52 is located in an evacuated chamber 48. The upper end of the fiber 52 is fixed by attachment to a fiber holder 54 (See FIG. 4). The other end of the fiber 52 is attached to suspended, movable mirror 36.

Figure 4:
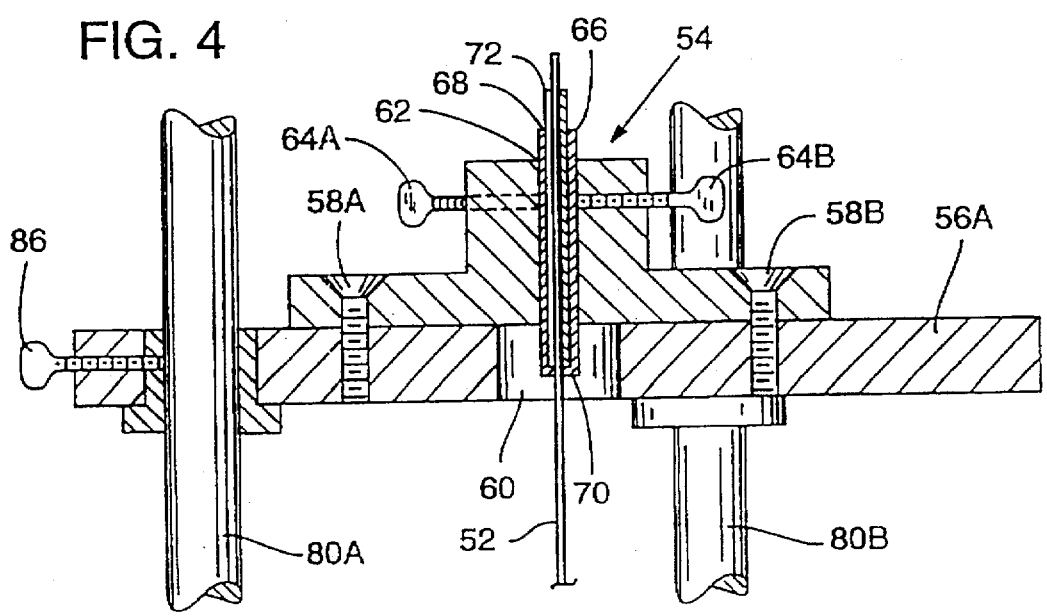
FIG. 4 is an exploded view of a fiber holding apparatus used in the device of FIG. 2.
Figure 3:
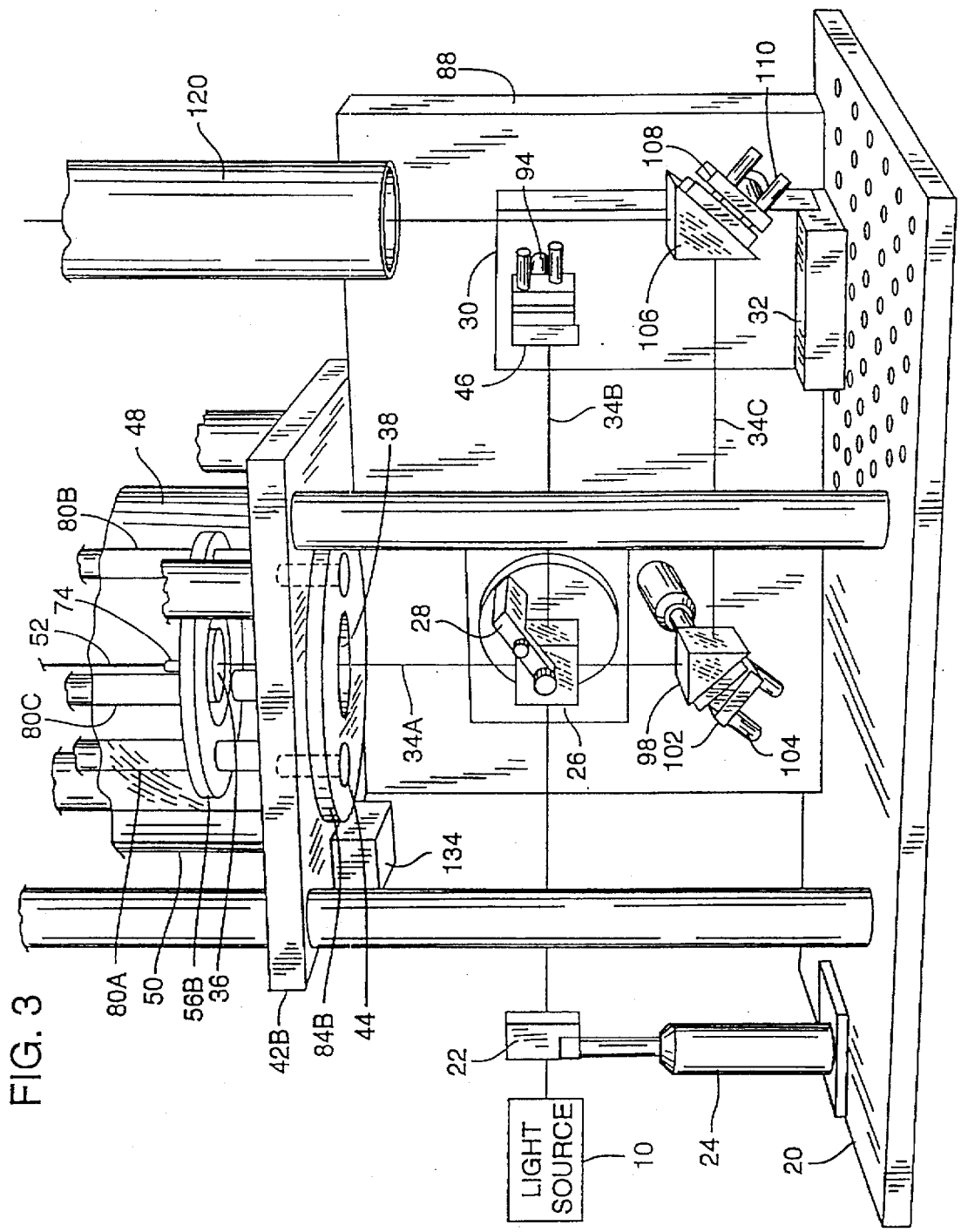
FIG. 3 is an exploded front view of the device illustrated in FIG. 2.

More specifically, and with reference to FIGS. 2–4, the apparatus 2 is assembled on a standard optical table 20 that was purchased from the Newport Company. The apparatus 2 generates a light beam using a light source 10, such as a laser. Although any light source likely will work for this invention, an apparatus 2 has been built using a 250 mW continuous krypton laser of conventional type (not shown) which emits light having a wavelength of about 647.1 nm. The light source 10 focuses light on a reflecting prism 22, which is supported by a conventional optic mount 24. For instance, the mount may be an MM-1 mount from the Newport Company. Prism 22 may be attached to the mount 24 using any conventional technique. However, for the illustrated embodiment of apparatus 2, prism 22, and all subsequent prisms, are attached to the holders using a transparent adhesive tape (not shown).

Prism 22 directs the light from light source 10 to a beam splitter 26, which is held securely in place by beam splitter mount 28. Mount 28 includes any structural device capable of holding the beam splitter 26 securely in place, such as a beam-splitter clamp. The illustrated embodiment of the mount 28 was purchased from the Newport Company. The mount 28 may be movably mounted to device 2 so that the position of the beam splitter 26 can be changed. For instance, beam splitter 26 may be attached to a plate that is free to move relative to the device 2. Such a plate is illustrated as plate 30 (FIG. 3) to which mirror 46 is attached. Plate 30 is free to move along rails 32. The position of sliding plate 30 along rails 32 can be fixed by tightening set screws (not shown).

Optical isolator 12 is shown schematically in FIG. 1, but the structure thereof is not illustrated in FIGS. 2–4. An optical isolator, such as isolator 12, may be used to prevent light from being transmitted from beam splitter 26 back into the light beam emitted by the laser 10. However, it has been found that the isolator 12 is not essential for the operation of the apparatus 2, and hence its incorporation into the device 2 is optional. If an optical isolator 12 is desired, it may comprise a polarizing beam splitter 14 and a wave plate, such as a λ/4 wave plate 16.

The beam splitter 26 typically is a broad band, 50:50 beam splitter which is designed to operate in the visible wavelengths. Beam splitter 26 is of a conventional design and may be purchased from such companies as Newport Company or Melles Griot. Beam splitter 26 splits the light directed thereto by the prism 22 into two light beams. Fifty percent of the light entering the splitter 26 is reflected and directed along light path 34A, and fifty percent is transmitted and directed along light path 34B.

As can best be seen in FIG. 3, light emitted by beam splitter 26 is directed through a quartz window 38 along a first light path 34A to a hanging, movable mirror 36. Hanging mirror 36 has a diameter of about 0.5 inch, weighs about 9 grams, and was purchased from the Newport Company. The distance light travels along path 34A may vary, but the illustrated embodiment of apparatus 2 had a light path distance between the beam splitter 26 and the movable mirror 36 of about 10 cm. Window 38 is mounted using conventional techniques in an attachment plate 40, which is attached to housing plate 42B using attachment screws 44. Quartz window 38 allows light to enter vacuum chamber 38 while maintaining the vacuum in this chamber. Attachment plate 40 may be sealed against vacuum leaks using conventional means, such as O-rings (not shown).

The second light beam from beam splitter 26 is directed to a fixed mirror 46 along light path 34B. Path 34B had a fixed light path distance of about 10 cm. Thus, the first arm of the interferometer in apparatus 2 is defined by the position of the hanging mirror 36. The second arm is defined by the position of the fixed mirror 46.

Mirror 36 is suspended inside chamber 48 using an optic fiber 52. Chamber 48 is defined by a cylindrical plexiglass housing member 50, which had a thickness of about ⅜ inch. Mirror 36 is attached to a lower end of optic fiber 52. The upper end of fiber 52 is fixed to a fiber holder 54. With reference to FIG. 4, it can be seen that the fiber holder 54 is attached to support ring 56A using attachment screws 58A, 58B. Support ring 56A defines a bore 60 therethrough. Fiber holder 54 also defines a bore 62 therethrough. Bores 60 and 62 are aligned when member 54 is attached to support ring 56A. Bore 62 typically has a diameter of about 0.5 inch. Fiber holder 54 also includes plural set screws 64A, 64B, which are inserted through fiber holder 54 and contact an insert sleeve 66, such as an aluminum insert, having a bore 68 therethrough. When tightened, set screws 64A, 64B hold insert 66 securely in place. Insert 66 is about 1 inch long and has an outer diameter of about 0.5 inch so that the insert 66 can be inserted into bore 62 of fiber holder 54. Insert sleeve 66 also includes an inner flange 70 at its lower end.

A second fiber-contacting insert 72 is dimensioned to be received in the bore 68, which has a diameter of about 0.25 inch. Insert 72 is placed inside insert 66 and contacts flange 70. In this manner, insert 72 can be held inside of insert 66. Although any material likely will work for forming insert 72, the illustrated embodiment of insert 72 was made from brass. Insert 72 is not a closed cylindrical member, as is insert 66. Rather, insert 72 is a split sleeve that has a thin slice of material removed from the cylinder wall to form a groove which runs the entire length of the cylinder in a direction parallel to the longitudinal axis of insert 72. Fiber 52 is inserted into split sleeve member 72, which in turn is placed in insert 66. Set screws 64 are then tightened to hold the inserts 66 and 72 inside the fiber holder 54.

The position of the movable mirror 36 is determined by the length of fiber 52. For this particular embodiment, optic fiber 52 was about 30 centimeters long, and had a radius of about 150 μm. The fiber 52 is attached to the mirror 36 by fiber attachment member 74. The illustrated embodiment of fiber attachment member 74 may be structurally identical to the fiber holder 54 described above, and hence also includes plural inserts and set screws. However, one skilled in the art will realize that attachment member 74 may be any structural mechanism that allows the fiber 52 to be securely attached to the mirror 36.

Attachment member 74 is situated inside the vacuum chamber 48. Plural support rods 80A, 80B and 80C, and plural support rings 56A, 56B, provide a framework for supporting the fiber receiving members 54 and 74. The plural support rods 80A–80C pass through plural orifices in plural support rings 56A, 56B, and are thereafter firmly attached to support plates 84A, 84B. Plates 84A, 84B are attached to housing plates 42A, 42B using any suitable means, such as attachment screws 44. Support rings 56A, 56B are movably attached to the plural support rods 80A–80C using plural set screws 86 as shown in FIG. 4. In this manner, plates 56A, 56B can be moved along support rods 80A–80C to adjust the vertical position of mirror 36. In the illustrated embodiment, support rods 80A–80C were threadedly attached to plates 84a, 84b.

Hanging mirror 36 is suspended from the fiber 52 and can move in a vertical direction parallel to the longitudinal axis of chamber 48 as a result of a change in length of fiber 52. Hanging mirror 36 was secured against lateral motion using plural radial threads 90 as shown in FIG. 2. The tension of these threads was relatively small compared to the tension of the fiber 52. Threads 90 may be made of any suitable material, such as a nylon monofilament. Threads 90 are attached to the lower support ring 56B and the attachment member 74 at attachment points which are oriented at about 120° intervals about the circumference of support ring 56B.

As stated above, beam splitter 26 splits the beam of light emitted by light source 10 into a first and second beam. The second beam emerging from the beam splitter 26 is directed along path 34B towards a fixed mirror 46. Mirror 46 is held securely in place by high precision optic mount 94, which includes fine adjustment screws. Optic mount 94 is movably attached to housing plate 88. Optic mount 94 is illustrated as being attached to plate 30, which is free to move along rails 32.

The first beam of light is transmitted along path 34A from beam splitter 26 to the hanging mirror 36 and is reflected back through the beam splitter 26 by the hanging mirror 36 as shown in FIG. 3. The second beam of light emitted by beam splitter 26 is reflected back through the beam splitter 26 by fixed mirror 46 so that the two beams of light are recombined. About 50 percent of the recombined light then is directed back towards the light source 10, and about 50 percent of the recombined light is directed towards prism 98 and reflected along light path 34C. A small portion of the combined light beam emerging from the beam splitter 26 is directed to a detector 100 (see FIG. 1).

The detector 100 used to make the illustrated embodiment of the apparatus 2 was a silicon photoelectric detector. This detector was interfaced with a 486 IBM compatible digital computer equipped with a LAB-PC board, and LABWINDOWS software. FIG. 1 shows the detector 100 placed to monitor the combined light beam as it emerges from the beam splitter 26. This portion of the combined light is not directed to the fiber 52. Positioning the detector 100 as shown in FIG. 1 does not divert any portion of the combined light intended to be absorbed by the fiber 52 to the detector 100. One skilled in the art will realize that the detector 100 also may be placed at different locations and still have apparatus 2 function properly, although the position of the detector 100 as illustrated in FIG. 1 currently is believed to be the best position for efficient operation of apparatus 2. This is because it is best to put as much of the combined light emerging from beam splitter 26 into fiber 52. If the detector 100 were positioned elsewhere, for instance along light path 34C, then a certain amount of the combined light intended to absorbed by fiber 52 would have to be diverted to the detector 100.

The combined light beam is reflected from the prism 98 along third light path 34C. The combined light beam includes position information concerning the position of the hanging mirror 36. This is because the intensity of the combined light emerging from the beam splitter 26 depends on the amount of destructive and constructive phase interference that is produced when the light beams are recombined. The amount of interference depends upon the distance each light beam travels along light paths 34A, 34B.

Prism 98 is held securely in place by a high-precision optic mount 102, having fine adjustment screws 104. Optic mount 102 is secured to housing plate 88 by conventional means, such as a clamp. Prism 98 directs the combined light beam to a third prism 106. Prism 106 is held securely in place by a high precision optic mount 108, which also includes fine adjustment screws 110. As with optic mount 102, mount 108 is secured to housing plate 88 using a clamp or any conventional means. The combined light beam is directed from third prism 106 through a shutter 112 (see FIG. 1) to a fourth prism 114. Prism 114 is held securely in place using a high-precision optic mount 116, having fine adjustment screws. The shutter 112 used to make the illustrated embodiment of the apparatus 2 was a standard camera shutter, which can be opened continuously, or for a brief period of time. Optical mount 116 is secured to upper housing plate 42A as shown in FIG. 2. The combined light beam from prism 106 to prism 114 may be directed through a shield tube 120 (FIG. 3), although this is not critical to the operation of the device. Shield tube 120 is used to protect the eyes of a person while operating the apparatus 2.

The light beam reflected by prism 114 is then directed through a pin-hole plate 122, which was purchased from Thorlabs, and towards a focusing lens 124. The pin-hole plate 122 has an adjustable aperture that adjusts from a maximum aperture of about 0.5 inch to a minimum aperture of about 1 mm. Plate 122 is threadedly attached to the housing plate 42A. Plate 122 is used to limit the amount of "light noise" that enters fiber 52. In other words, pin-hole plate 122 limits the light entering fiber 52 to the center-fringe portion of the combined light from apparatus 2 that travels along light path 34C.

The focusing lens 124 has a diameter of about 1 inch and a focal length of about 15 cm. These characteristics of lens 124 are not critical to the operation of the apparatus 2 because the position of the lens 124 can be changed relative to the other components of the apparatus 2. Lens 124 is held securely in place using a standard optical clamp 126.

Lens 124 focuses the light onto a fifth prism 128 (FIG. 1). As with the previous prisms, prism 128 is held in place using a high-precision optic mount 130 having fine adjustment screws. This illustrated embodiment of the apparatus 2 uses a 5-way high precision optic mount 130, model number PB-3 by MRC, as shown in FIG. 2. Optic mount 130 is secured to housing plate 42A using attachment screws (not shown). The position of optic mount 130 can be changed by loosening the screws and moving the mount along a mounting rail (also not shown).

Prism 128 directs the light beam into an upper end of optic fiber 52. About 10–30 mW of the light are absorbed by the fiber 52. It should be noted that the light entering the fiber 52 does not re-enter the apparatus 2. Fiber 52 is located in chamber 48. Chamber 48 generally is evacuated by attaching a vacuum pump to vacuum nozzle 134. Evacuating chamber 48 helps minimize external disturbances that alter the position of the mirror 36. Such disturbances may result, for example, from sound vibrations, thermal gradients and air currents.

Because the position of the mirror 36 is determined by the length of fiber 52, the output light intensity of the interferometer also is determined by the length of the fiber 52. As stated above, the light output of the apparatus 2 is directed through the shutter 112 as shown in FIG. 1, and to the upper end of fiber 52. A portion of the light entering the fiber 52 is partially absorbed by the fiber 52, which in turn causes photothermal heating. If the length of the fiber 52 changes as a result of photothermal heating, then the position of the hanging mirror 36 changes. This alters the output light intensity of apparatus 2. In other words, the output of the apparatus 2 is determined by the length of the fiber 52, and the length of the fiber 52 is determined by the output of the apparatus 2. Thus, the optical system described above provides an optical-feedback system which allows for continuous adjustment in the position of the mirror 36.

III. POSITIONING CAPABILITY OF OPTIC FIBERS

The apparatus described above has been used to evaluate the positioning ability of optical fibers which change their length as a result of photothermal heating. In the described embodiment of apparatus 2, heat energy produced by optical heating is used to control the length of the fiber 52. By using feedback, the length of the fiber 52 can be controlled in three ways, namely stabilization, discrete positioning and continuous positioning.

Figure 5:
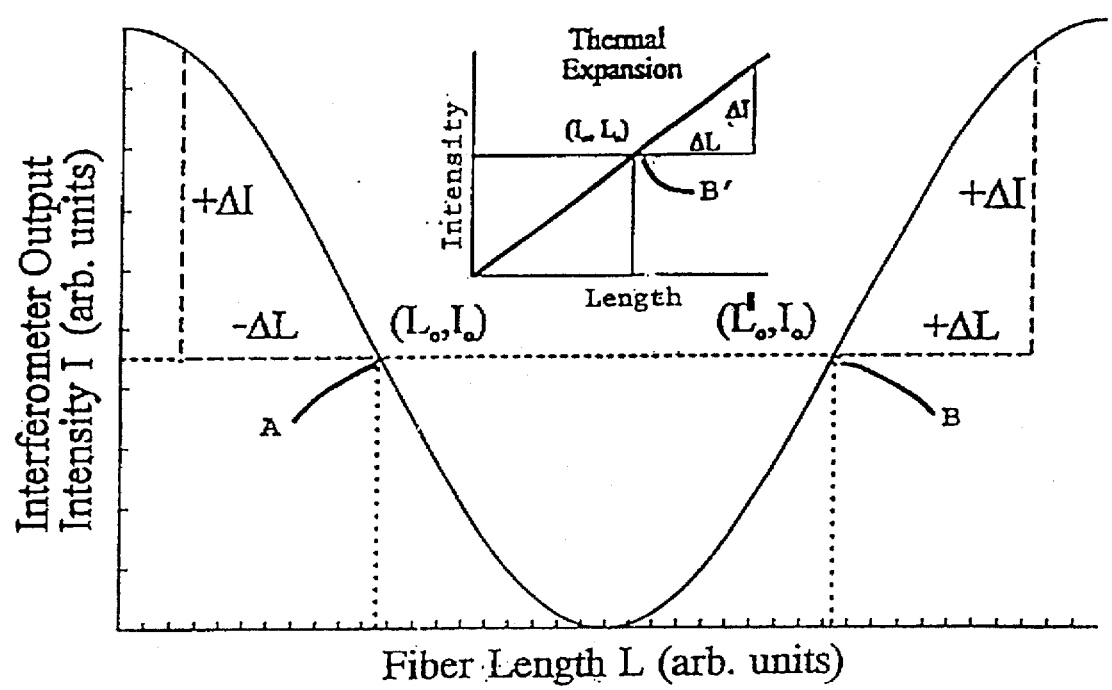
FIG. 5 is a graph of the change in fiber length that occurs as the intensity of the light output changes from the apparatus of FIG. 2.

FIG. 5 depicts the change in fiber length that occurred in a light-transmitting PMAA-squarylium dye doped optic fiber as a function of the intensity of the light output from the apparatus 2. FIG. 5 shows that the relationship between the fiber length and the interferometer output light intensity describes a sinusoidal curve. FIG. 5 shows that if the fiber length of the polymeric fiber is $L_0$ and the light intensity of the fiber is $I_0$, and if the conditions are such that the slope at point A ($L_0$ and $I_0$) is negative, then an external impulse that acts to shorten the fiber length will lead to an increase in the light intensity of the fiber. If the thermal expansion coefficient of the optic fiber is positive, then thermal heating due to such increased light intensity causes the fiber length to increase. This helps to negate the effect of the external impulse.

If the conditions are such that the slope at the point B ($L_0$ and $I_0$) is positive, then a material having a negative thermal expansion coefficient also will counteract any external impulse that causes the fiber length to lengthen. Thus, it will be understood that if the apparatus is tuned so that the slope of the curve at particular intensity and length values is in the negative slope domain, then active stabilization of the fiber will require a material having a positive thermal expansion coefficient. Conversely, if the apparatus is tuned so that the slope is positive at the point corresponding to particular intensity and fiber-length values, then active stabilization will require that the material used to make the optic fiber 52 have a negative thermal expansion coefficient.

A. Discrete Positioning at Stable Fiber Lengths

For any set of conditions provided the apparatus interferometer (e.g., thermal expansion coefficient of the fiber, the length of the fiber, the wavelength of light emitted by the light source, the heat capacity of the fiber, the mass of the fiber, etc.) there are several intensities at which stabilization of the fibers occurs. These points are referred to herein as stable or equilibrium points. The motion of the fiber is described by Equation 1 below:

$$dl = [(\alpha la P_o/mc) \cos^2 (2\pi(l-l_o)/\lambda + \phi) - l - l_o/\tau_c] dt \qquad \text{EQUATION 1}$$

where $\alpha$ is the coefficient of thermal expansion, c is the heat capacity of the fiber, $\tau_c$ is the thermal cooling time constant, $\lambda$ is the wavelength of light, l is the fiber length, $l_o$ is the initial length of the fiber, m is the mass of the fiber, $\phi$ is the ambient phase difference between the two arms of the interferometer, $P_o$ is the maximum laser power input to the fiber at the constructive interference condition of the interferometer, a is the fraction of laser power absorbed by the fiber, and t is time. Using this formula, the stable lengths of the fiber can be determined by setting the velocity of the end of the fiber to zero. This results in the following Equation 2:

$$(c/\alpha)(m/\tau_c a P_o)[(l-l_o)/l_o + (l-l_o)] = \cos^2 [2\pi(l-l_o)/\alpha + \phi] \qquad \text{EQUATION 2}$$

Figure 6:
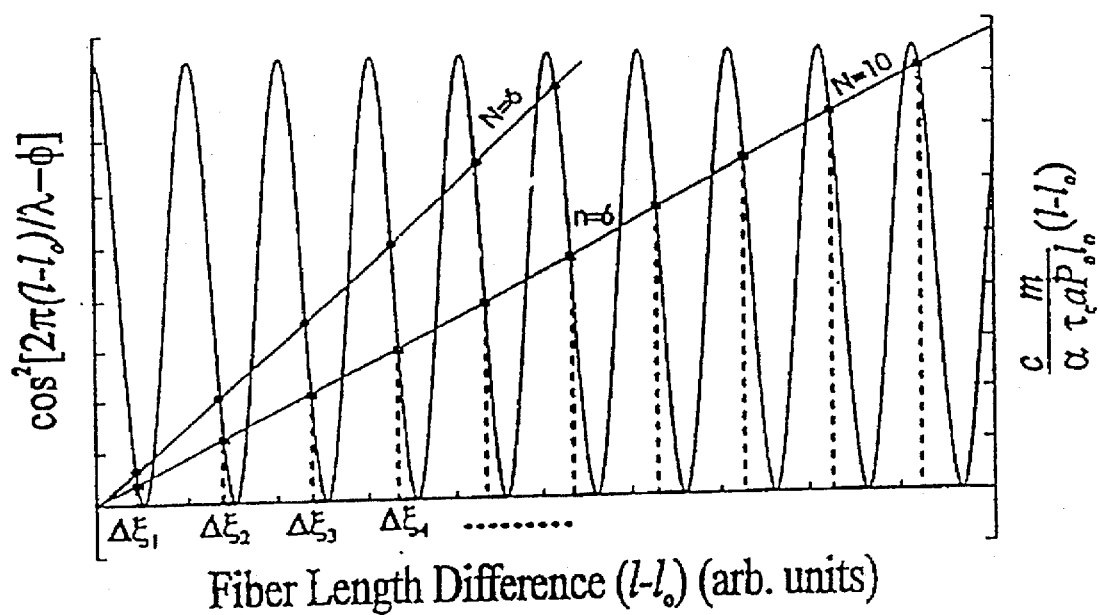
FIG. 6 is a graph showing the determination of equilibrium points for an optic fiber used in the apparatus of FIG. 2.

The term $(l-l_o)$ is small compared to $l_o$. As a result, this term can be ignored without incurring significant error in solving Equation 2. The stable points can be determined by adjusting the phase difference so that there is a maximum power input at $l=l_o$, and by plotting the two sides of Equation 2 as shown in FIG. 6. The left hand side of this equation describes a straight line, whereas the right hand side of the equation defines a cosine-squared function. Each point where the line intersects the cosine-squared curve is a stable point that can be adopted by the It is important to realize that the determination of the equilibrium points, and hence the intersection points on the cosine-squared curve, depends upon the thermal expansion coefficient of the fiber. More specifically, FIG. 6 represents the situation where the fiber has a positive thermal expansion coefficient because the point of intersection shown on the cosine-squared curve is on the negative slope domain of the curve. However, if the material used to make the optic fiber has a negative thermal expansion coefficient, then the stable points would be determined by the points of intersection on the positive slope regions of the cosine-squared curve.

It has been found that if an optic fiber is tuned to some equilibrium point $(L_n, I_n)$ then an external impulse that causes the fiber length to increase past the minimum of the cosine squared curve will cause the fiber to settle to the new equilibrium point $(L_{n+1}, I_{n+1})$. This is referred to as discrete positioning because there is a change in the length of the fiber from one length to the next, rather than a continuous change in length over the lengths intermediate $L_n$ and $L_{n+1}$. However, the change in the length of the fiber that corresponds to each of these equilibrium points differs. For instance, the length of the fiber change that corresponds to a transition from a first to a second equilibrium point is not necessarily the same length change that corresponds to a transition from the second equilibrium point to a third equilibrium point.

There are numerous applications for a device capable of discrete positioning. For instance, discrete positioning could be used to position optics to focus a light beam. Another example would be to use a laser pulse to position a laser beam for cutting materials in a manufacturing process.

Figure 7:
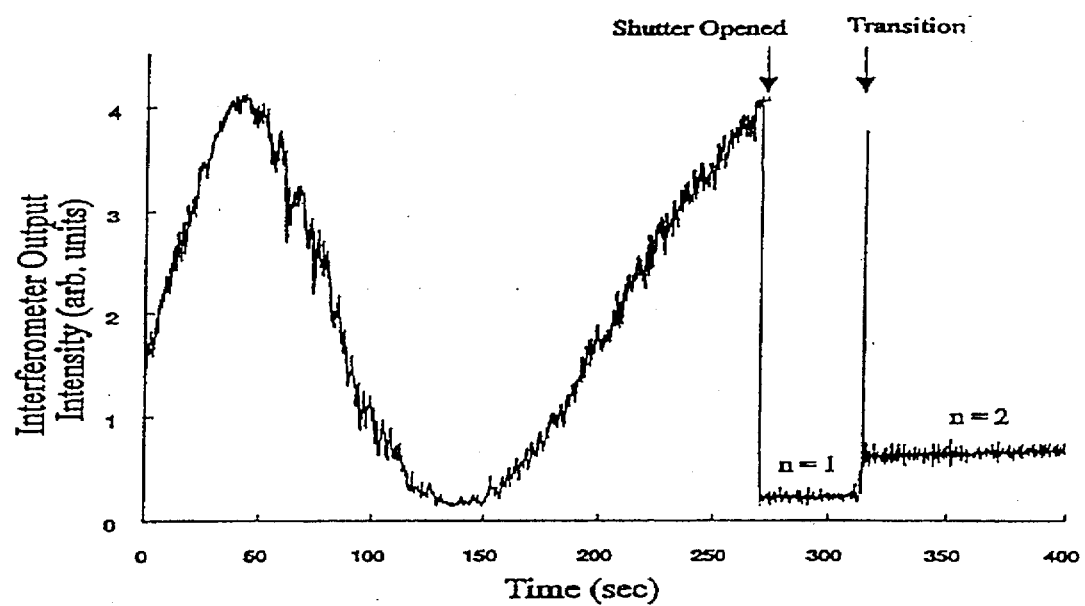
FIG. 7 is a graph of the change in output intensity over time for the apparatus of FIG. 2.
Figure 8:
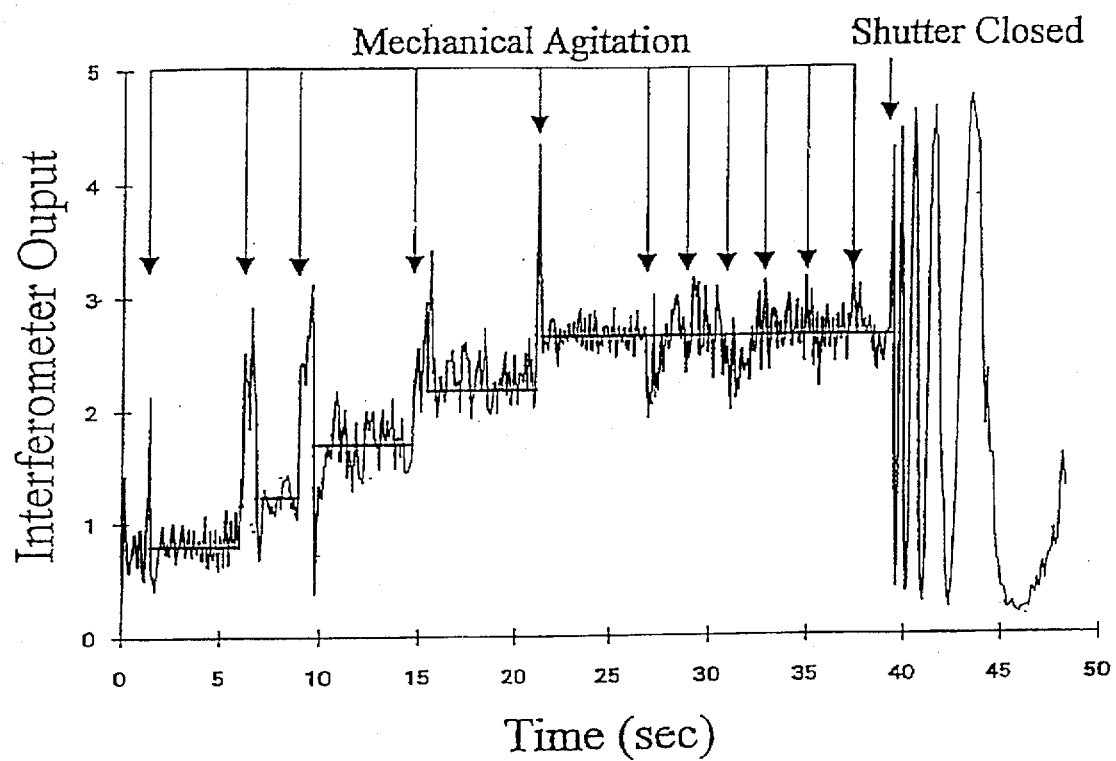
FIG. 8 is a graph of the change in output intensity over time for the apparatus of FIG. 2 which illustrates that optic fibers of the present invention can adopt plural lengths corresponding to plural fiber-length equilibrium points.

FIGS. 7 and 8 present experimental data obtained using apparatus 2. FIG. 7 shows the output intensity as it changes over time. When the shutter of the apparatus 2 is closed (from T=0, to T=about 270 seconds), the drift in the output intensity of the apparatus is apparent. When the shutter is closed, there is no optical feedback because the fiber 52 is not absorbing any of the light output from the apparatus 2. As a result, with the shutter closed there is no correction in the length of the fiber 52 as the output drifts.

At a time t equal to about 270 seconds, the shutter was opened and the apparatus 2 began operating using optical feedback. It can be seen from FIG. 7 that the present invention provides a means for stabilizing the length of the optic fiber within a very short period of time. More specifically, FIG. 7 shows that the fiber length adopted a stable equilibrium point (N=1) in a period of only about 250 milliseconds. Thereafter, the fiber length spontaneously changed from a first stable point N=1, to a second stable point N=2. This transition occurred after a period of about 40 seconds. It is not surprising that the length of the fiber underwent a transition from the first equilibrium point to the second equilibrium point. This is because the first equilibrium point generally is the least stable of all the equilibrium points. After the transition from the first equilibrium point to the second equilibrium point, the fiber length was stable at the second equilibrium point to within plus or minus 2 nm for a period of at least about 30 minutes. It also is important to note that the fiber of the apparatus had a length of about 30 cm, and was able to be stabilized within about plus or minus 2 nm, which translates to about 1 part in $10^8$ stability.

Thus, FIG. 7 clearly demonstrates that the apparatus light intensity output, and therefore the fiber's length, can be stabilized using optical feedback and the photomechanical effect. Furthermore, FIG. 7 shows that the optic fiber will adopt an equilibrium length that allows the fiber to maintain the output intensity virtually constant, even over a period of greater than about 30 minutes. By testing the equilibrium points of a PMAA fiber, it has been determined that such fibers adopt a length and an intensity relationship that generally allows the fibers to adopt a stable equilibrium point. The fibers maintain the length corresponding to that equilibrium point until the application of some critical external perturbing force, such as mechanical agitation.

If the fiber is to change its length from one equilibrium point to a higher equilibrium point, then the length of the fiber must increase to a length that is greater than that corresponding to the minimum intensity output of the apparatus, which corresponds to the minimum of the cosine-squared curve. Increasing the fiber length can be accomplished by applying an external force to the fiber. This external force can by virtually any force, such as a mechanical force or an acoustical force. Hence, if the position of the mirror is altered by being jarred, or from air currents, then the length of the fiber may change from a first equilibrium point to a second point, thereby repositioning and stabilizing the movable mirror.

This situation is depicted in FIG. 8, which presents experimental data showing that the fiber can adopt multiple stable lengths. More specifically, FIG. 8 illustrates the change in apparatus output over time. At a time t=0 to about t=5 seconds, the apparatus was operating with the fiber at a first equilibrium length. Thereafter, the apparatus was mechanically agitated, which induced the fiber to undergo a change in fiber length from a first equilibrium point to a second equilibrium point. This mechanical agitation was then repeated, so that the fiber length adopted plural fiber equilibrium lengths. However, after the fiber adopted a fourth equilibrium length, further agitation could not induce a subsequent change in fiber length to a fifth equilibrium point. Thus, FIG. 8 shows that the fiber can adopt plural equilibrium lengths until a fiber length is obtained which resists perturbations that tend to change the position of the mirror. At the fourth stable length, further mechanical agitation could not induce a subsequent change in the length of the fiber. At t=about 40 seconds, the shutter was closed, and the drift in the apparatus output is apparent.

Alternatively, the thermal energy accompanying the transmission of a light beam can be used to induce a change in the length of the fiber from a first equilibrium point to a second equilibrium point. This provides a means for positioning a movable object at discrete positions, such as moving a focusing lens from a first position to a second position by applying an external force sufficient to cause a transition from a first equilibrium point to a second equilibrium point.

An estimate of the relative stabilities of each equilibrium point can be determined from the critical distance. This is because the two major factors influencing the stability of such points are the critical distance and the slope of the cosine-squared curve. A large critical distance will allow larger perturbations to occur without causing the fiber to progress to another stable point. Moreover, the greater the slope of the cosine-squared curve, the greater will be the stabilization effect because of the sensitivity of the apparatus to changes in the length of the fiber. By plotting the critical distance versus the slope of the cosine-squared curve, it has been determined that the least stable of the equilibrium points is the first equilibrium point. The most stable point corresponds N/2. Thus, for the N=10 line of FIG. 6, N=5 or N=6 are the most stable equilibrium points for the fiber.

It also is apparent that the amount of time it takes a fiber to adopt an equilibrium point (response time) will vary. The main parameters that determine the response time for a particular fiber are the radius of the fiber, the absorbance of the fiber, and the power of the light source. For PMAA fibers, it has been determined that thinner fibers will have a faster response time. More specifically, for a PMAA fiber having a radius of about 40 μm, the response time is on the order of about 8 ms.

FIG. 6 also indicates that the length of the fiber can be continuously changed, as opposed to undergoing discrete fiber length changes, by using a variable power source. One means of accomplishing this would be to vary the output intensity of the light source. For example, assume that a device is tuned so that the fiber length corresponds to the N=6 equilibrium point. By increasing the laser power, the length of the fiber can be changed continuously from the point corresponding to N=6 on the line having a slope with six equilibrium points, to the N=6 point on the line having a slope with ten equilibrium points.

The intensity of the light leaving the interferometer is given by Equation 3 with the shutter closed:

$$I = I_{max} \cos^2 (\alpha \, EXP\, [-A\tau]) \qquad \text{EQUATION 3}$$

where $\tau$ is a time constant. The cooling constant for the fibers can be determined by plotting $\ln(\cos^{-1}(I/I_{max})^{1/2})$ versus time. It has been determined that the poly(methyl methacrylate) fibers described above have cooling constants on the order of about 2 seconds, although this depends to a large extent on the extent of the vacuum in the chamber 48.

IV. ADDITIONAL APPLICATIONS

The previous paragraphs presented a detailed description concerning one embodiment of an apparatus that utilizes the method associated with positioning and stabilizing movable objects using optic fibers and the photomechanical effect. However, the scope of this invention is not limited to this particular application, as will be readily appreciated by those skilled in the art. For instance, the technology described in this application can be used to convert input energy of one form to output energy of another form, i.e., can be used as a transducer. This aspect of the invention is described in more detail below. One skilled in the art of transducers will realize that the technology described herein therefore can be used in virtually any application now known or hereinafter discovered for transducers. This would include such diverse applications as strain gauges and optical-speaker arrangements. Moreover, the optical fiber can be miniaturized and used as the cavity of a Fabry-Perot waveguide or interferometer as illustrated in FIG. 9. The term "Fabry-Perot" is used to describe the device because light is reflected from the ends thereof. "Waveguide" is associated with "Fabry-Perot" because an optical fiber is used. Also, these fibers and associated light source can be used to form logic-elements. A logic-element is defined as having, for instance, two inputs that provide an output. If the input is light, then the output may be an associated mechanical change, i.e., a strain output. Certain of these aspects are discussed in more detail below.

V. FABRY-PEROT INTERFEROMETER

The multiple-beam interferometer, first constructed by Charles Fabry and Alfred Perot in the late 1800s, is of considerable importance in modern optics. Besides being a spectroscopic device of extremely high resolving power, it serves as the basic laser resonant cavity. In principle, the conventional device consists of two plane, parallel, highly reflecting surfaces separated by some distance d. This is the simplest configuration. However, there also are other known configurations, and the present invention provides even another configuration. Conventional Fabry-Perot interferometers include two semisilvered or aluminized glass optical flats which form reflecting boundary surfaces that enclose an air gap. The enclosed air gap generally ranges from several millimeters to several centimeters when the apparatus is used interferometrically, and often to considerably greater lengths when it serves as a laser resonant cavity. If the gap can be mechanically varied, it's referred to as an interferometer. When the reflectors are held fixed it's said to be an etalon. Nevertheless, it is still an interferometer in the broad sense. Indeed, if the two surfaces of a single quartz plate are appropriately polished and silvered, it too will serve as an etalon; the gap need not be air.

Fabry-Perot interferometers of conventional design are described in many sources. For instance, Chapter 9 of Hecht's *Optics, Second Edition*, Addison-Wesley Publishing (1987) provides a description of a Fabry-Perot interferometer. This discussion is incorporated herein by reference. The etalon described in Hecht includes a broad source, which might be a mercury arc or a He—Ne laser beam spread out in diameter to several centimeters. Only one ray emitted from some point $S_1$ on the source is traced through the etalon. Entering by way of the partially silvered plate, it is multiply reflected within the gap. Any other ray emitted from a different point $S_2$, parallel to the original ray and in that plane of incidence, will form a spot at a point P. The multiple waves generated in the cavity, arriving at P from either $S_1$ or $S_2$, are coherent among themselves. But the rays arising from $S_1$ are completely incoherent with respect to those from $S_2$, so that there is not sustained mutual interference. All the rays incident on the gap at a given angle will result in a single circular fringe of uniform irradiance. With a broad diffuse source, the interference bands will be narrow concentric rings, corresponding to the multiple-beam transmission pattern.

A hypothetical, purely monochromatic lightwave generates a particular circular fringe system. But $\delta$ is a function of $\lambda_o$, so that if the source were made up of two such monochromatic components, two superimposed ring systems would result.

Figure 9A:
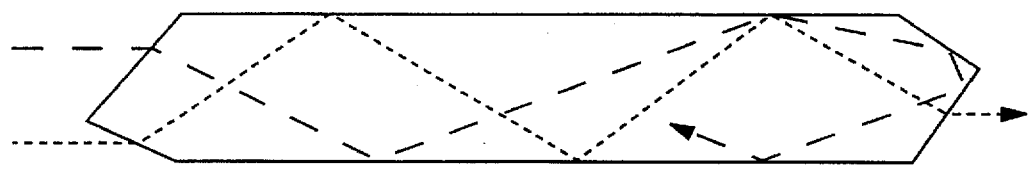
FIGS. 9a and 9b are a schematic representation of a polymer fiber waveguide Fabry-Perot cavity.
Figure 9B:
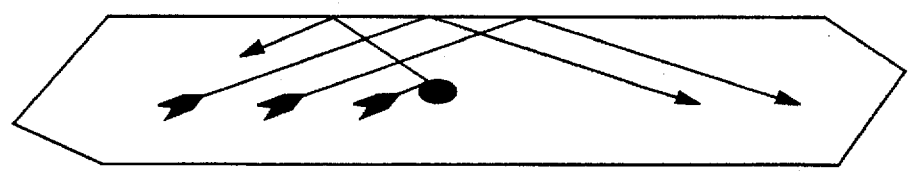
Figure 10:
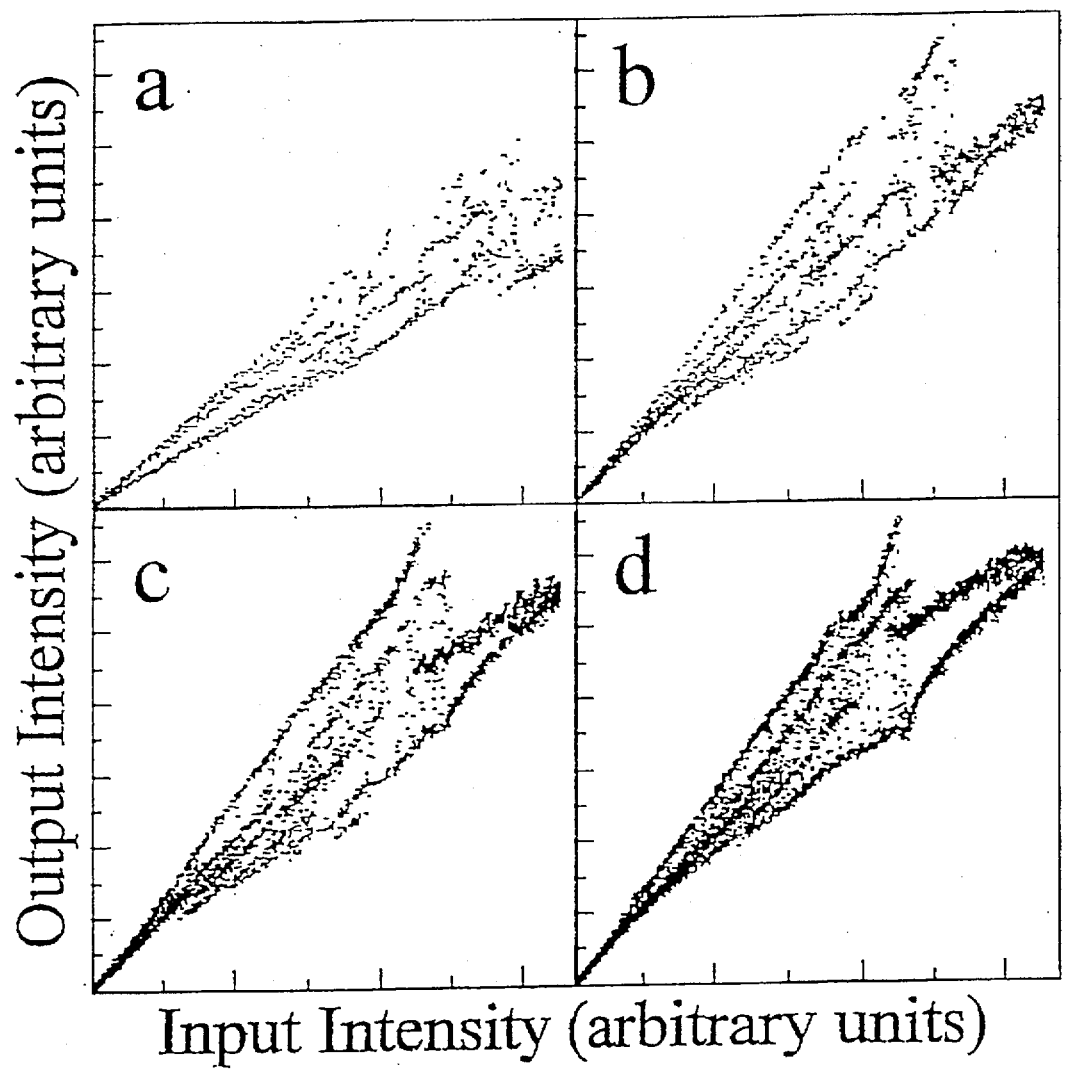
FIGS. 10a–10d are graphs illustrating the output intensity as a function of the input intensity in arbitrary units for the waveguide illustrated in FIG. 9 as different ramp rates.

The present invention can be used to incorporate a Fabry-Perot waveguide interferometer. FIGS. 9a and b shows a schematic diagram of a poly(methyl methacrylate) polymer optical fiber that was doped with an azo dye and formed into a 2.5 cm by 110 µm fiber as discussed above. The dye has at least two functions. The dyes function as light absorbers. However, they also can be used to provide internal reflectors, or gratings, by being coupled to a light source of sufficient intensity to "burn" the region adjacent the dye. The fiber can be converted into a Fabry-Perot interferometer by fraying (e.g. splitting, cutting, or any other means by which reflectance is enhanced) the ends of the fiber to form retroreflectors, or burning the reflectors into the fiber. By fraying with reflectances on the order of 5%–10%. The cone angles illustrated in FIG. 9 are exaggerated for the sake of illustration. FIG. 9a shows two rays—one that is reflected and one that is transmitted. FIG. 9b shows how imperfections and impurities inside the waveguide can scatter light to form a secondary Fabry-Perot cavity.

The Fabry-Perot polymeric waveguide of the present invention uses the following: a light source, such as laser or photodiode; and a small (generally the smaller the better) polymeric fiber, such as a fiber smaller than about 2.5 cm, and typically from about 0.5 mm to abut 2.5 cm. The fiber generally is doped with a dopant as described above. However, it should also be understood that a dye could be directly or integrally associated with the polymer matrix, i.e., as part of the polymeric structure itself. Thus, "doped" or "dopant" as used herein includes the actual addition of a dye or dyes to the polymer matrix, having the dye be a part of the polymer, or any other mechanism by which an absorbing dye can absorb light and impart, at least partially, the effects of the energy absorption to the fiber. For example, the output intensity of the fiber is, at least in part, a function of the fiber length, which in turn is associated with increases resulting from photothermal heating. For the apparatus illustrated in FIG. 1, the length of the fiber was about 30 cms. This length typically is sufficient so that dyes need not, but may, be included in the fiber to achieve a sufficient absorption of the light by the fiber. The fiber must absorb a sufficient amount of light over its length so that the effects of that absorption, such as photothermal heating, can be seen. The absorption of light by the fiber can be altered by including dyes therein, changing the amount of dye used, or by varying both the length of the fiber and the amount of dye used, i.e., there is a relationship between the doping levels, the length of the fiber and the absorption thereby. To make the fiber as short as possible, the dye should be used up to its solubility limits in the liquid monomer that is used to form the polymer. Solely by way of example, it currently is believed that dye weight percents of less than about 1.0 weight percent, and typically about 0.1 to about 0.7 weight percent, are useful for practicing the invention. Again solely by way of example, it currently is believed that the fiber preferably should absorb about 50% of the light along its length to function properly. If the absorption is much less than about 50%, then there will be insufficient response by the fiber to the absorption. If the absorption is much greater than about 50%, than the light will not be reflected sufficiently.

The diameter of fibers suitable for this application may vary. Solely by way of example, fibers having a diameter of from about 80µ to about 110 µm are known to be useful for making fibers suitable for this application.

In general, the reflectance of the fiber is increased. This can be accomplished in a number of ways. One means is to fray the ends of the fiber. The ends can be cut to have substantially pyramidal ends, as illustrated in FIG. 9. This fraying allows the ends of the fibers to act as internal reflectors, and thus help establish the cavity of a Fabry-perot interferometer. Reflectance also can be achieved by establishing reflectance gratings in the fiber itself. One method for accomplishing this is to couple dyes to an external source to "burn" portions of the fiber. This also can be accomplished by transmitting into the fiber separate wavelengths which interfere or reinforce each other at certain regions of the fiber.

Once the fiber is prepared according to the guidelines provided above, the light source and fiber are positioned adjacent each other so that the light emitted by the light source can be transmitted (coupled) into the end of the fiber that is adjacent the light source. This positioning of the light source adjacent to the fiber can be accomplished by any suitable means. However, solely by way of example, the fiber and light source can be positioned adjacent each other using an optics table, such as a Newport table. This has been accomplished in the following manner. The light source was securely coupled to the Newport table. One edge of a small sheet of a polymer material was then cut. A small, doped fiber having frayed ends was then positioned in the cut so that the fiber extended transversely through the sheet with each end of the fiber protruding beyond each major opposed planar surface of the sheet. This sheet was then secured to the Newport table adjacent to the light source. Alternatively, the light source may be actually attached to or integral with the fiber. This could be achieved, for instance, by using an optic fiber to convey light to a fiber treated as described herein.

The relative positioning of the light source and the fiber is not critical. If the distance between the light source and fiber is too great, then the light emerging from the light source can be focused on the end of the fiber using a focusing lens. Moreover, virtually any light source can be used to practice the invention. For example and without limitation, the light source can be a laser, a photodiode, or an optic fiber. The only criteria is that the light from the light source be coupled to the polymeric waveguide. Moreover, the light source need not be limited to the visible spectrum, so that light energy of virtually any wavelength including in the ultraviolet or infrared regions, also can be used.

To operate the device, the light source is positioned so that the light can be coupled to the polymeric waveguide. The light source is then activated and the light coupled to the polymeric waveguide.

Without limiting the invention to one theory of operation, it is believed that the Fabry-Perot polymer waveguide operates as follows. The intensity of the light inside the interferometer depends on the separation of the reflectors and the refractive index of the material between the reflectors. Through photothermal heating, both the length and refractive index of the device depends on the light intensity inside the device. This 'internal' feedback mechanism results in multiple length and refractive index states for a fixed incident intensity. Thus, the fibers described herein have multiple stable states. This indicates that for a given input intensity, there are several states of output. For instance, for a given intensity input, the device may have several stable lengths, several stable intensities, or both. From the output of the device, it can be determined that the fiber is undergoing transformations to different states. A traditional sign of multiple stability is when the input is increased and then decreased, a hysteresis is evidenced. A hysteresis generally indicates bistability. However, FIGS. 10–13 indicate that the present device actually has more than two stable states. The particular state of the system depends on its optical and mechanical history. Furthermore, at each of the discrete equilibrium lengths, the length of the device should be stabilized to mechanical agitation as described above. The difference between the larger device illustrated schematically in FIG. 1 and the miniaturized version illustrated schematically in FIG. 9 is that the equilibrium state of the larger device did not depend on the refractive index of the fiber. Based on literature values of the thermal expansion coefficient and temperature dependence of the refractive index, it is estimated that about ⅓ of the change in the phase shift after one round trip in the device is due to the length change.

The photomechanical multistability of the device illustrated in FIG. 9 also was determined by measuring its optical input/output characteristics. This demonstration of multistability is illustrated by way of the following examples.

EXAMPLE 4

A fiber having a length of about 2.5 cm and a diameter of about 110 μm was doped with about 0.5 weight percent of Disperse Red 1 Azo dye as described above. An 18 mW diode laser (Toshiba 9140) was selected as the light source. The diode laser and the fiber were positioned adjacent each other on a Newport table as discussed above. The 18 mW diode laser emits a beam at 685 nm, which was launched into the end of the fiber adjacent the diode laser. The efficiency at which the light is coupled to the fiber generally is expressed in terms of percents. For the present example, about a 50% coupling efficiency was achieved. Typical coupling efficiencies are from about 30 percent to about 70 percent. A small portion of the incident beam was deflected to a silicon detector (Thorlabs Model DET1-SI) to monitor its intensity. The transmitted intensity also was read by a photodiode, and the voltage of each detector was read by a Gateway 2000 4DX 33V computer that was interfaced through a National Instruments AT-MIO-16f-5 board using LabView for Windows. The same interface board controls the intensity of the laser diode by sending a voltage to the diode controller (ThorLabs LDS900).

Using this configuration, data was collected concerning the relationship of the input intensity to the output intensity. FIGS. 10a–10d are plots of the output intensity as a function of the input intensity for a saw-tooth input. The differences between the data illustrated in FIGS. 10a–10d concern the ramp rates. FIG. 10a was generated using a ramp rate of about 0.285 mW/s, FIG. 10b was generated using a ramp rate of about 0.143 mW/s, FIG. 10c was generated using a ramp rate of about 0.057 mW/s, and FIG. 10d was generated using a ramp rate of about 0.0143 mW/s. Characteristic time scales associated with some of the underlying mechanism(s) are much longer than 1s so that the results are sensitive to the ramp rate. Because of the complexity of the plots, it is difficult to follow the hysteresis.

Figure 11:
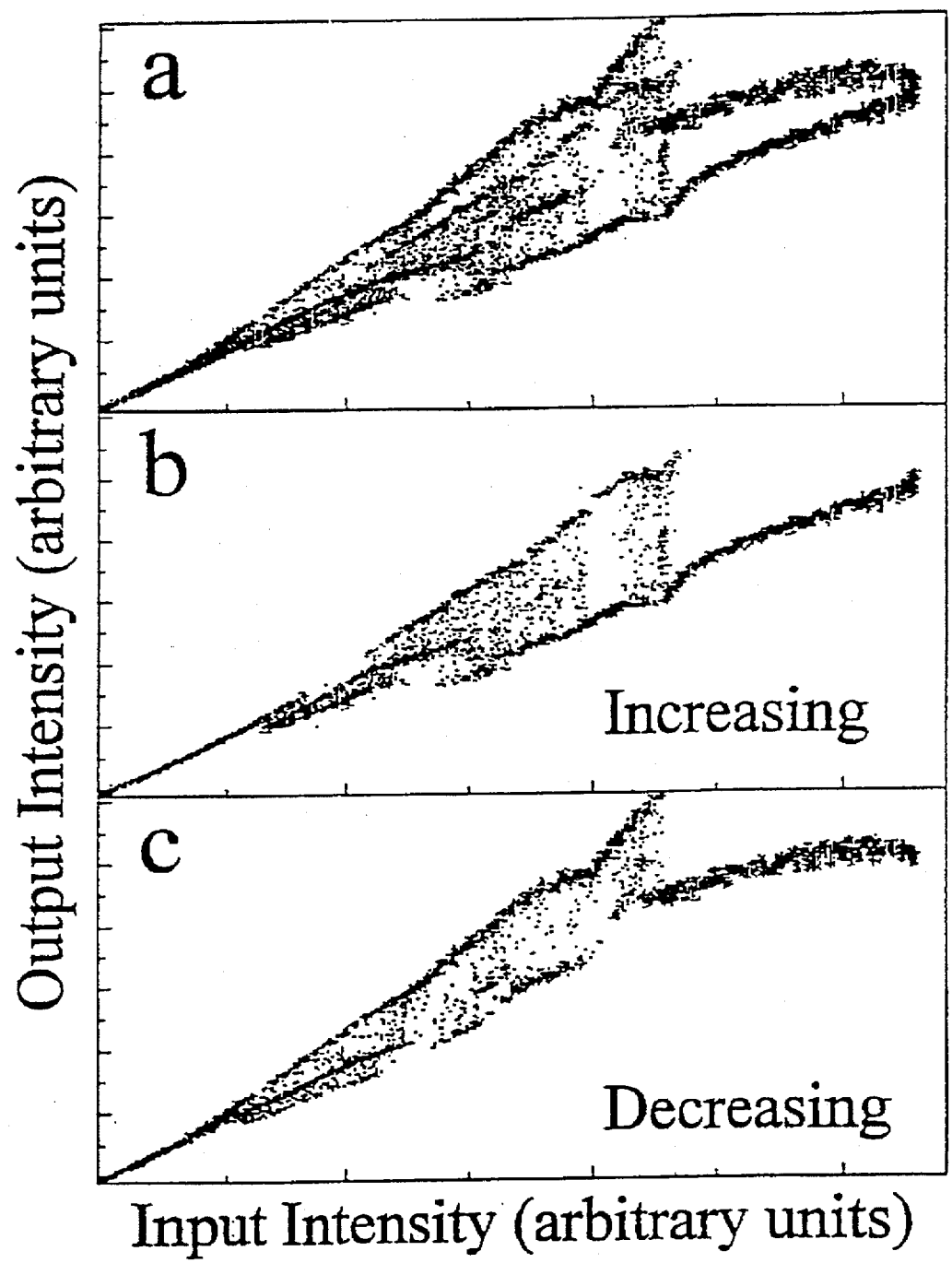
FIG. 11a is a graph illustrating the output intensity as a function of the input intensity in arbitrary units for the waveguide illustrated in FIG. 9 at a ramp rate of about 0.01425 mW/s for one ramping cycle.
FIG. 11b is a graph illustrating the output intensity as a function of the input intensity in arbitrary units for the waveguide illustrated in FIG. 9 at a ramp rate of about 0.01425 mW/s for ramp up.
FIG. 11c is a graph illustrating the output intensity as a function of the input intensity in arbitrary units for the waveguide illustrated in FIG. 9 at a ramp rate of about 0.01425 mW/s for ramp down.

FIG. 11 shows an expanded plot of a 0.01425 mW/s ramp run where the ramp-up and ramp-down data are separated. It is clear from this data that at the higher input intensities, there is a clear loop. At lower intensities, the output intensity hops between two or three branches. Different branches are observed during ramp-up than ramp-down.

Figure 12:
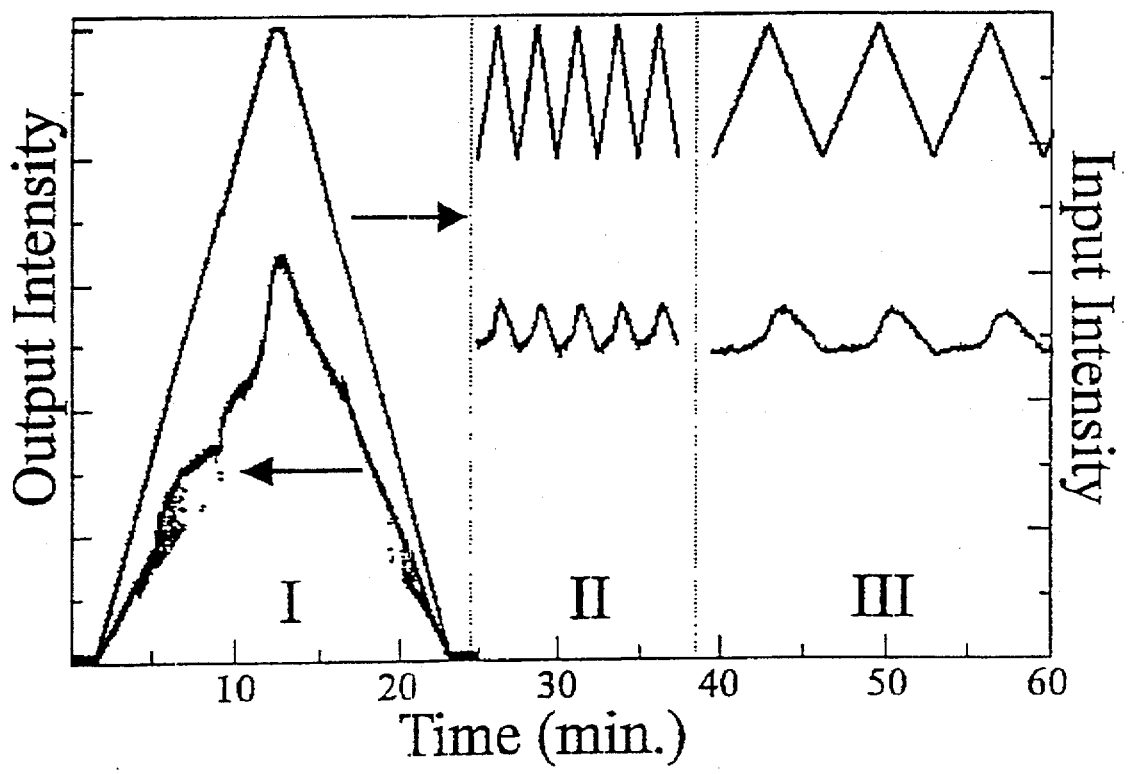
FIG. 12 illustrates the input and output intensity as a function of time for the device illustrated in FIG. 9.
Figure 13:
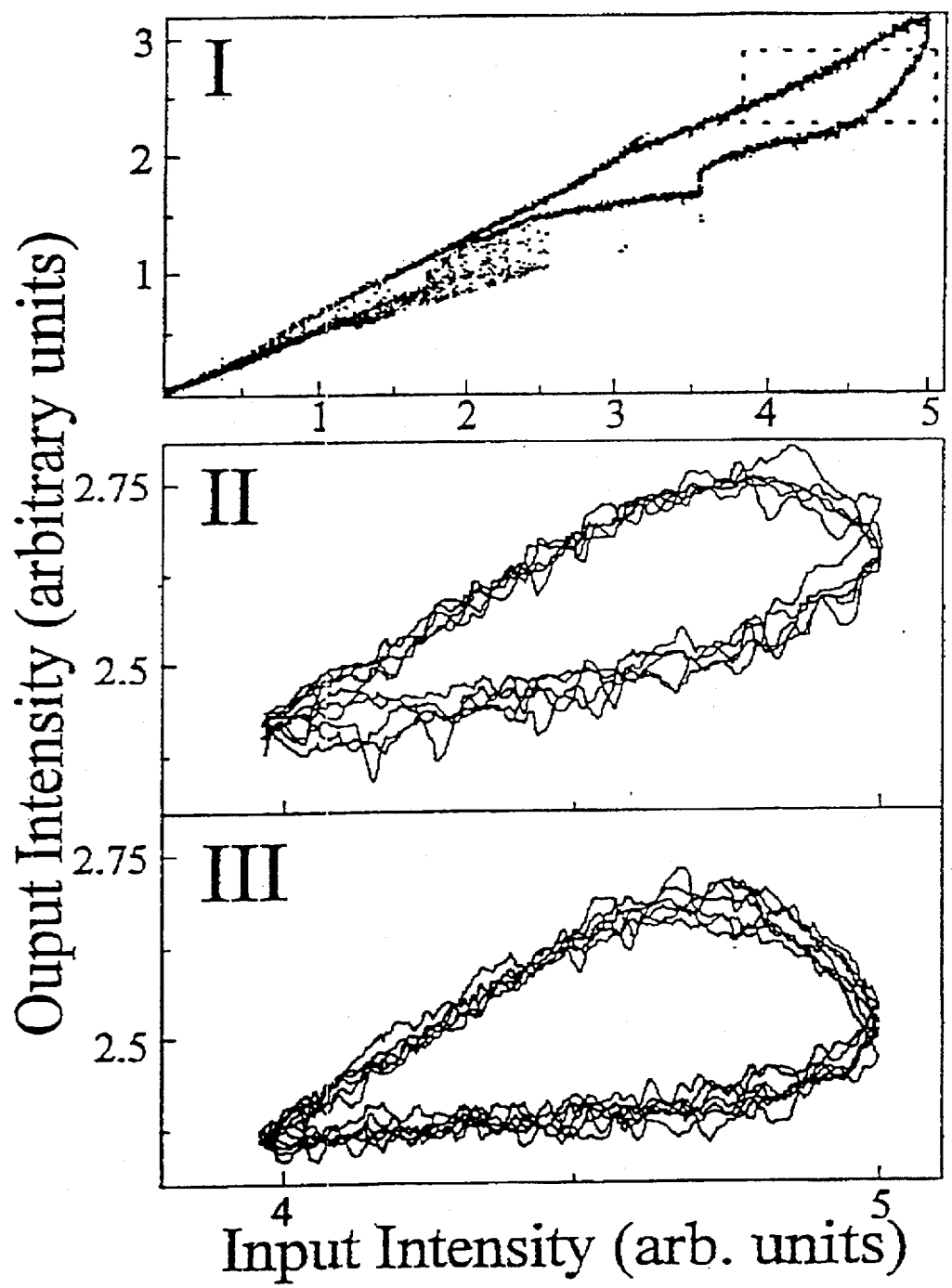
FIG. 13 provides graphs illustrating the output as a function of input for the device illustrated in FIG. 9 in each of the regions depicted in FIG. 12

FIG. 12 shows the time dependence of the input and output intensity of a program that was used to map out the high-intensity hysteresis loop. The ramp rate is 0.0285 mW/s for the first cycle. The input is then ramped between 14.1 mW and 18 mW repeatedly at a ramp rate of 0.052 mW/s. Subsequently, the input is repeatedly ramped between 14.1 mW and 18 mW at a ramp rate of 0.02 mW/s. The corresponding output intensity is also plotted. FIG. 13 shows an input/output plot for each of the three regions I, II and III of FIG. 12. The dashed box in FIG. 13 represents the input/output range measured in Regions II and III of FIG. 12. Note that the size of the loop gets larger when the ramp rate is decrease and that the loop is reproducible.

Without limiting the invention to one theory of operation, it currently is believed that there are two mechanisms responsible for the photomechanical response: photothermal heating and cis/trans isomerization. Photothermal heating results in both a length change and refractive index change. The response time for a 30 cm by 400 μm fiber is about 100 ms. The response time for the miniaturized device should be much shorter because of its smaller mass (it takes less time to heat a smaller mass). Cis/trans isomerization, in which the molecule changes shape in response to light, is known to occur over several minutes at comparable power levels. Competition between these two mechanisms apparently leads to the qualitative difference in hysteresis between the different ramp rates.

Preliminary computations show that the observed behavior can be qualitatively described if the system is modeled as two coupled Fabry-Perot cavities. Given that the finesse of the device of FIG. 9a currently is low, an imperfection inside the cavity that results in even a small amount of reflection can, in principle, result in an added 'reflector' as illustrated in FIG. 9b.

In summary, a miniaturized all-optical photomechanical logic element in a polymer optical fiber has been made and used. As used herein a logic element means that the fiber takes two inputs, and based on the values of the inputs, has a single output corresponding thereto, much like an "and gate" or an "or gate." The input can be two light inputs, with a light output. The input can be a light input or a strain input, with a light output, or the input can be two light inputs, with a strain output.

VI. PHOTOMECHANICAL TRANSDUCER

Based on the above discussion, it will be apparent to one skilled in the art that the present invention can be used as a transducer. A transducer is any device that can convert input energy of one form to output energy of another form. The present invention can be used to convert light energy into mechanical energy, or mechanical energy into light energy. This is a significant advantage over known transducers in that the transduction is accomplished directly, whereas known devices require additional intermediate processing. This aspect of the invention can use a fiber as described above in reference to the attachment of a movable object, such as the mirror, thereto. In this sense, the physical movement of the device and corresponding change IN fiber length is associated with a change in the intensity of the fiber's light output. In other words, the light fiber can act as a transducer so that a change in mechanical energy can be associated with a change in light energy, or vice versa. This can be used in a number of applications that will be recognized by a persons skilled in the art of transducers.

Alternatively, a single fiber can be associated with a light source to act as a transducer wherein the fiber ends are frayed, or the fiber is manufactured to have internal reflectors as a result of defects in the fiber. This concept is illustrated schematically in FIG. 9. These internal defects can be incorporated into a fiber by several possible means. Fibers can be produced having virtually any length and percents of defects. These fibers can be used in a variety of applications to function as transducers for transducing either light energy into mechanical energy, or mechanical energy into light energy. One example would be a strain gauge wherein the fiber is associated with a device, such as by being wrapped around the device or by being incorporated into the structural components of the device. If the fiber associated with such a device were coupled to a light source, and if the device experienced an external mechanical strain, this strain would be resisted by the fiber. This fiber could be a relatively long fiber that had several internal reflectors included therein by burning or other means. Such a fiber would function as if it were a plural Fabry-Perot waveguides linked in series.

The present invention has been described with reference to preferred embodiments. However, it should be understood that the invention can be modified without departing from such principles. We claim as our invention all such modifications as fall within the scope of the following claims.

We claim:

1. A photomechanical transducer, comprising:

a photomechanical material having a first optical path length and reflective end portions or internal reflective regions, the photomechanical material changing from the first optical path length to a second optical path length in response to light and/or mechanical energy inputs;

a light source for generating a beam of light that is transmitted through the photomechanical material; and an object coupled to the photomechanical material, the photomechanical material and the object defining a photomechanical transducer so that light energy into the photomechanical transducer is correlated with mechanical energy output to the object and mechanical energy into the photomechanical transducer is correlated with light energy output by the photomechanical material as a result of changing from the first optical path length to the second optical path length.

2. The transducer of claim 1 wherein the photomechanical material includes a light absorbing dye.

3. The transducer according to claim 2 wherein the photomechanical material includes a dye dopant having an absorption maximum substantially the same as the wavelength emitted by the light source.

4. A Fabry-Perot polymeric waveguide, comprising:

a polymeric optic fiber comprising a photomechanical material which is itself capable of absorbing light or which further comprises a material capable of absorbing light, the fiber having reflective portions, the fiber having a length and absorbing at least a portion of light transmitted along its length; and a light source for transmitting light into the optic fiber.

5. A Fabry-Perot polymeric waveguide comprising:

a polymeric optic fiber having reflective portions and wherein the fiber includes a dye in an amount substantially equal to the solubility limit of the dye in the polymer, the fiber having a length and absorbing at least a portion of light transmitted along its length; and a light source for transmitting light into the optic fiber.

6. A Fabry-Perot polymeric waveguide comprising:

a polymeric optic fiber having reflective portions and comprising a dye in an amount which is less than about 1.0 weight percent; and a light source for transmitting light into the optic fiber.

7. The waveguide according to claim 6 wherein the dye is included in the fiber in an amount of from about 0.1 to about 0.7 weight percent.

8. A Fabry-Perot polymeric waveguide comprising:

a polymeric optic fiber having reflective portions and wherein the fiber absorbs at least about 50 percent of the light transmitted along its length; and a light source for transmitting light into the optic fiber.

9. A sensor, comprising:

a photomechanical material for receiving light, the photomechanical material having an optical path length;

a light source coupled to the photomechanical material; and a detector coupled to the photomechanical material for detecting changes in the optical path length.

10. The sensor according to claim 9 wherein the optical fiber exerts a force on the detector and the detector detects changes in the force exerted by the fiber.

11. The sensor according to claim 9 and further including a light source coupled to the fiber.

12. A sensor, comprising:

a photomechanical fiber for receiving light, the fiber having an optical path length, the fiber also absorbing at least about 50 percent of the light transmitted along its length;

a light source coupled to the fiber; and a detector coupled to the fiber for detecting changes in the light energy output from the fiber in response to changes in the optical path length of the fiber.

13. An optical switch, comprising:

a polymeric optic fiber having reflective portions, the fiber having an optical path length and absorbing at least a portion of light transmitted along its length;

a signal light source coupled to the polymeric optic fiber; and a control light source coupled to the optic fiber for transmitting control light into the optic fiber for controlling the optical path length, thereby also controlling light output by the optic fiber from the signal light source.

14. A photomechanical transistor, comprising:

a photomechanical material having a first optical path length and reflective end portions or internal reflective regions, the photomechanical material changing from the first optical path length to a second optical path length in response to light and/or mechanical energy inputs; and a light source for generating a beam of light that is transmitted through the fiber.

15. A method for providing internal feedback in a photomechanical positioning device, comprising:

providing a photomechanical material having a first optical path length and reflective end portions or internal reflective regions, the photomechanical material changing from the first optical path length to a second optical path length in response to light and/or mechanical energy inputs;

transmitting a beam of light through the photomechanical material; and coupling a movable object to the photomechanical material, the photomechanical material and the object defining a photomechanical transducer so that light energy into the photomechanical transducer is correlated with mechanical energy output to the object and mechanical energy into the photomechanical transducer is correlated with light energy output by the photomechanical material as a result of changing from the first optical path length to the second optical path length.

16. An associative network, comprising:

a first photomechanical material having reflective portions and a length, the material also including a dye for absorbing at least a portion of light transmitted along its length;

at least a second photomechanical material coupled in series with the first photomechanical material, the second photomechanical material having reflective portions and a length, the second photomechanical material also including a dye for absorbing at least a portion of light transmitted along its length; and a light source for transmitting light into the first or second photomechanical material.

17. The network according to claim 16 and further including three or more photomechanical materials coupled in series, each photomechanical material comprising reflective portions and light-absorbing materials.

18. The network according to claim 16 wherein the first photomechanical material absorbs at least about 50% of the light transmitted along its length.

19. The network according to claim 16 wherein the second photomechanical material absorbs at least about 50% of the light transmitted along its length.

20. The network according to claim 16 wherein the first and second photomechanical materials absorb at least about 50% of the light transmitted along their length.

* * * * *